United States Patent [19]

Giannone

[11] 3,970,132

[45] July 20, 1976

[54] TIRE CHAIN ASSEMBLY

[76] Inventor: Victor S. Giannone, 952 Central Ave., Peekskill, N.Y. 10566

[22] Filed: July 2, 1975

[21] Appl. No.: 592,629

[52] U.S. Cl. .............................. 152/233; 152/217; 152/241
[51] Int. Cl.² .................. B60C 27/10; B60C 27/02
[58] Field of Search ............... 152/213 R, 217–219, 152/221–223, 225, 233, 241; 24/196, 197

[56] References Cited
UNITED STATES PATENTS

| | | |
|---|---|---|
| 2,638,954 | 5/1953 | Anderson ........................... 152/217 |
| 2,820,502 | 1/1958 | Spencer ............................. 152/218 |
| 2,918,960 | 12/1959 | McGuinness ....................... 152/233 |
| 3,856,069 | 12/1974 | Giannone ........................... 152/233 |
| 3,858,634 | 1/1975 | Giannone ......................... 152/213 A |

Primary Examiner—Drayton E. Hoffman
Attorney, Agent, or Firm—Sughrue, Rothwell, Mion, Zinn & Macpeak

[57] ABSTRACT

An improved tire chain assembly of the type having adjustable inboard and outboard rope straps has link chains which extend at intervals between the straps, and includes a series of adjustment clamps on the rope straps whereby the assembly is securely but releasably engaged on a wheel.

3 Claims, 3 Drawing Figures

TIRE CHAIN ASSEMBLY

BACKGROUND OF THE INVENTION

1. Field of the Invention

This invention pertains to tire chain assemblies for vehicle wheels, the assemblies being characterized by their relative simplicity of attachment and dismounting.

2. Statement of the Prior Art

This invention pertains to an improvement in tire chain devices of the type shown in my prior U.S. Pat. Nos. 3,856,069 and 3,858,634. Reference is also made to the prior art reflected in the files of those patents.

SUMMARY OF THE INVENTION

The tire chain devices covered by the aforesaid prior patents are characterized by ease of attachment and removal from a wheel. The improvement herein is directed to simplification of the means for adjustment of the assembly when in place. This involves a slidable clamp which includes a pivot locking lever. The central strap forming the chain retainer is adapted for loose application to the wheel, and may be subsequently tightened by manipulation of the clamps. This further speeds application of the assembly to the wheel, even under extreme weather conditions.

The present arrangement enhances the range of wheel sizes to which the assembly is applicable.

A further feature of importance of the present invention is the provision of a locking lever having a conveniently positioned release handle for the clamps.

Other and further objects and advantages of the invention will become apparent to those skilled in the art from a consideration of the following specification when read in conjunction with the annexed drawing.

DESCRIPTION OF THE PREFERRED EMBODIMENT

Figure 1:
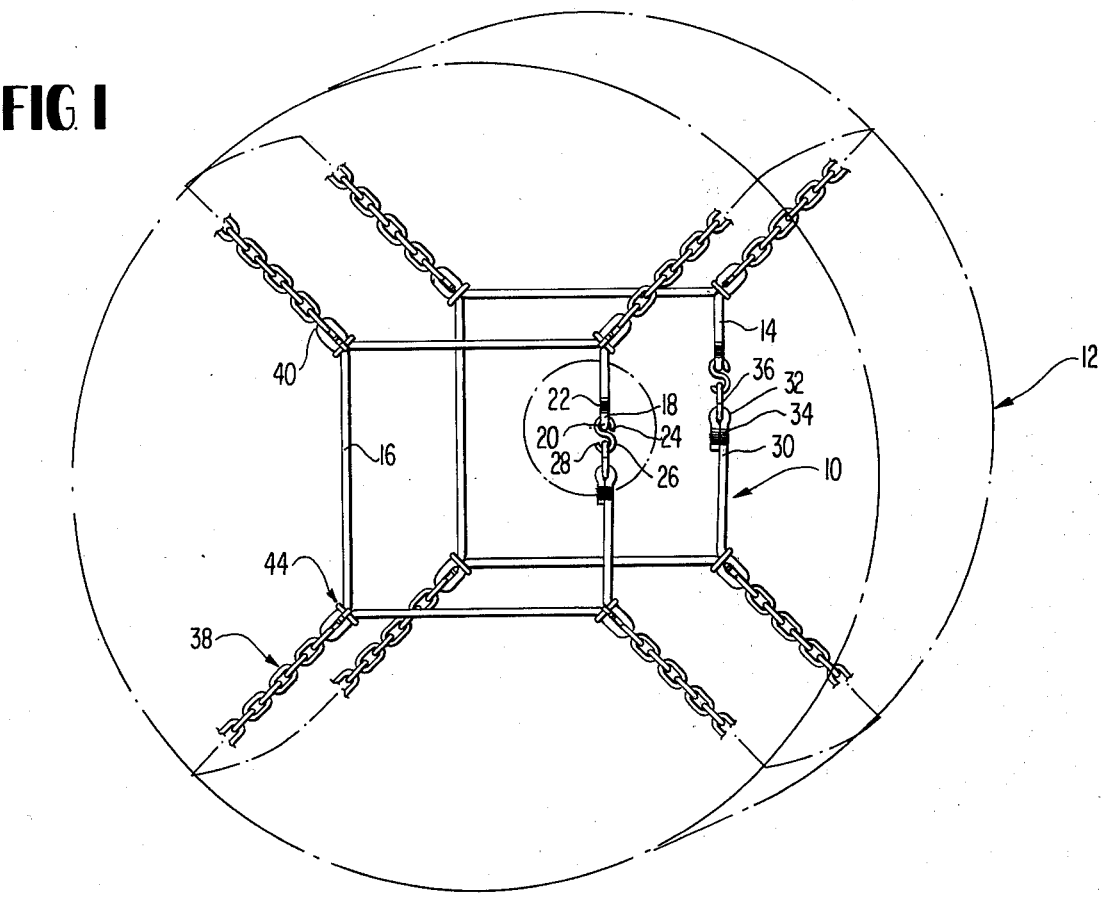
FIG. 1 is a perspective view of a tire chain assembly constructed and assembled in accordance with the teachings of this invention, the vehicle wheel being shown in phantom line.

In FIG. 1 of the drawing, an adjustable tire chain assembly 10 is shown as applied to a wheel 12. The assembly includes an inboard strap rope 14 and an outboard strap rope 16. Except for the position of the strap ropes, they are identical, and a description of one should suffice for both. The strap ropes may be of any suitable flexible material, including polypropylene or the like. Each has a first end 18 reverted to a loop 20 and bound in place by wrapping 22. The loops 20 extend through a closed eye 24 of a clasp 26 which also has an open eye 28. The other ends 30 of the strap ropes are formed in loops 32, by wrapping 34, and extend through annular ring members 36. The ring members are engageable in the open eyes 28. Thus, the strap rope ends may be connected to one another in releasable fashion.

Figure 2:
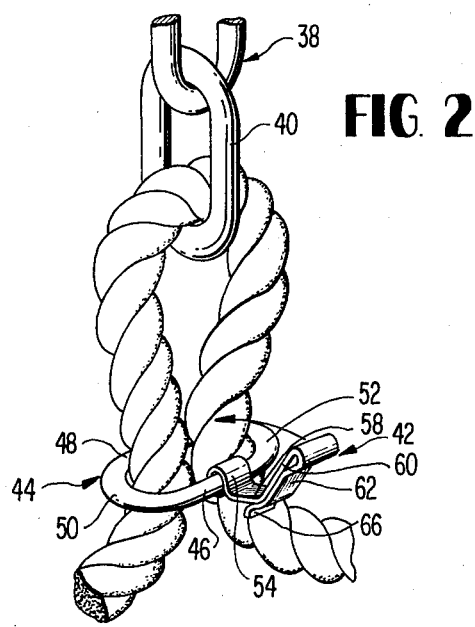
FIG. 2 is an enlarged perspective view of the details of the strap rope, link and clamp hereof.
Figure 3:
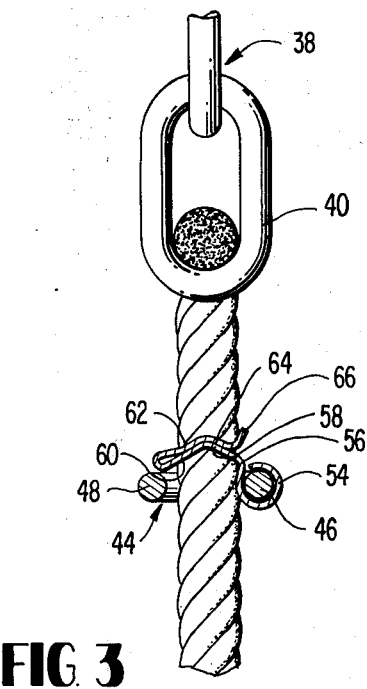
FIG. 3 is a vertical cross-sectional view through the mid-point of the unit as seen in FIG. 2.

The traction means per se hereof comprises a series of link chains 38 which extend between the inboard and outboard strap ropes. The link chains each have terminal links 40 at their ends, and the strap ropes extend through these terminal links, as shown in FIGS. 2 and 3. The chains thus are adapted for positioning at radially spaced locations about the tread portion of the wheel to provide traction in ice, mud, snow, or the like.

A principal feature of this invention resides in the provision of a series of adjustment clamps 42 for the strap ropes. Each clamp 42 comprises a slidable band 44 having elongated side sections 46, 48, and end sections 50 and 52. A hinge sleeve 54 is pivotally mounted on the side section 46, and carries a lever 56. The lever 56 is concave in the direction of the band, having a first inclined portion 58, and a second portion 60. At the extremity of the lever opposite the hinge sleeve, it is rebent back against the portions 58 and 60, forming corresponding outer portions 62 and 64. At the end of the outer portion 64, an upwardly projecting release handle 66 is provided.

Application of the device to the wheel 12 involves initial placement of the inboard rope strap on the inside of the wheel. In some vehicles of limited accessibility, a rod or wire is used to position the inboard strap and to secure the ring member 36 in the open eye 28 of the clasp 26. The circumference of the inboard strap has been preset by estimate to the approximate size needed prior to such application. Thereafter, with the chains 38 trained across the wheel, the outboard strap is positioned by connection of the clasp 26 to the ring 36. Final adjustment to tighten the position involves sliding of the bands 44 of the adjustment clamps 42 inwardly on the loops formed in the strap ropes to that degree of tightness desired. The levers are then pressed into wedge contact with the ropes as shown in FIGS. 2 and 3 — the latter Figure showing the locked position. Release is effected by pressure on the handle 66 when removal of the device is to be effected.

I claim:

1. An adjustable tire chain assembly comprising:
   inboard and outboard flexible strap ropes, each of said strap ropes having loop ends;
   clasp means for connecting said loop ends releasably together;
   link chains extending between the inboard and outboard strap ropes at spaced locations, said link chains having terminal links at each end thereof, and the strap ropes extending between said terminal links on the inboard and outboard ends respectively thereof;
   a series of adjustment clamps for the strap ropes to tightly engage the assembly on a vehicle wheel, said adjustment clamps each comprising a band having side sections and end sections, a hinge sleeve pivotally mounted on one of said side sections, and a lever on said sleeve;
   the lever being concave in the direction of the band, and having a release handle extending in the opposite direction; and
   the strap ropes having loops thereof extended through said handle adjacent said locations where the link chains are located, the bands being slidable on said loops to positions effecting tight connection of the tire chain assembly on the wheel, and the levers being pivotal to locking positions which wedge the strap ropes and bands together.

2. The invention of claim 1, wherein: the clasp means comprises a hook element.

3. The invention of claim 1, wherein: the release handle projects upwardly from the lever in locked position whereby outward force thereon releases the lever from locked position.

* * * * *